United States Patent
Ashibe

(10) Patent No.: US 10,988,613 B2
(45) Date of Patent: Apr. 27, 2021

(54) RESIN COMPOSITION, PRODUCTION PROCESS THEREOF AND OPTICAL INSTRUMENT

(71) Applicant: CANON KABUSHIKI KAISHA, Tokyo (JP)

(72) Inventor: Tsunenori Ashibe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 332 days.

(21) Appl. No.: 15/779,721

(22) PCT Filed: Dec. 8, 2016

(86) PCT No.: PCT/JP2016/087319
§ 371 (c)(1),
(2) Date: May 29, 2018

(87) PCT Pub. No.: WO2017/099260
PCT Pub. Date: Jun. 15, 2017

(65) Prior Publication Data
US 2020/0299505 A1     Sep. 24, 2020

(30) Foreign Application Priority Data
Dec. 10, 2015   (JP) .............................. JP2015-241361

(51) Int. Cl.
*C08L 69/00*     (2006.01)
*C08K 3/04*      (2006.01)
(Continued)

(52) U.S. Cl.
CPC ................ *C08L 69/00* (2013.01); *C08K 3/04* (2013.01); *C08K 7/06* (2013.01); *C08K 9/04* (2013.01); *C08K 2201/001* (2013.01)

(58) Field of Classification Search
CPC ............... C08K 3/04; C08K 7/06; C08K 9/04
See application file for complete search history.

(56) References Cited

U.S. PATENT DOCUMENTS

2002/0061449 A1   5/2002   Maruo et al.
2019/0317427 A1*  10/2019  Yane ..................... B29B 7/905

FOREIGN PATENT DOCUMENTS

CN     104130572 A  * 11/2014
JP     59-106571 A    6/1984
(Continued)

OTHER PUBLICATIONS

Machine translation of CN 104130572 (Year: 2020).*
(Continued)

*Primary Examiner* — Michael M Dollinger
(74) *Attorney, Agent, or Firm* — Venable LLP

(57) ABSTRACT

The invention provides a resin composition containing a resin, a carbon fiber and a conductive liquid, wherein the content of the resin is 47 to 94.9% by mass in the composition, the content of the carbon fiber is 5 to 50% by mass in the composition, and the content of the conductive liquid is 0.1 to 3% by mass in the composition, and wherein the concentration of an element contained in the conductive liquid as measured by SEM-EDS on the surface of the carbon fiber is 1.3 times or more as much as the concentration of the element contained in the resin.

9 Claims, 4 Drawing Sheets

(51) Int. Cl.
  *C08K 7/06*   (2006.01)
  *C08K 9/04*   (2006.01)

(56) References Cited

FOREIGN PATENT DOCUMENTS

| | | |
|---|---|---|
| JP | 61-258860 A | 11/1986 |
| JP | 62-37397 A | 2/1987 |
| JP | 6-9819 A | 1/1994 |
| JP | 2003-003078 A | 1/2003 |
| JP | 2005-220316 A | 8/2005 |
| JP | 2010-31424 A | 2/2010 |
| JP | 2010-90372 A | 4/2010 |
| JP | 2012-167251 A | 9/2012 |
| JP | 2012-229345 A | 11/2012 |

OTHER PUBLICATIONS

Machine translation of JP 2010031424 (Year: 2020).*
Machine translation of JP 2010090372 (Year: 2020).*
Zhang et al. J. Chem. Eng. Data 2012, 57, 8, 2185-2190. (Year: 2012).*
Iolitec. 1-(2-Hydroxyethyl)-3-methylimidazolium Tetrafluoroborate. Available online at https://iolitec.de/en/products/ionic_liquids/catalogue/imidazolium-based/il-0038-hp (Year: 2011).*

\* cited by examiner

RESIN COMPOSITION, PRODUCTION PROCESS THEREOF AND OPTICAL INSTRUMENT

TECHNICAL FIELD

The present invention relates to a resin composition and a production process thereof. In particular, the present invention relates to a conductive carbon fiber resin composition useful as an electric field shielding member making good use of high conductivity and as housings for various electronic and electrical instruments such as a digital single-lens reflex camera, a compact digital camera, a smartphone and a personal computer.

BACKGROUND ART

A carbon fiber resin composition has heretofore been widely used in a digital single-lens reflex camera, a compact digital camera, a smartphone, a personal computer and the like for the purpose of achieving both electric field shielding property for preventing malfunction of the products and weight saving.

Patent Literature 1 discloses carbon fiber reinforced thermoplastic resins (CFRTP) in order for the thermoplastic resins to have the electric field shielding property.

Carbon fiber makes a thermoplastic resin conductive by mixing a large amount of the carbon fiber into the thermoplastic resin because of its high conductivity in order for the thermoplastic resin to have electric field shielding property and antistatic characteristics by virtue of a conductive effect.

Patent Literature 2 discloses that the surface of carbon fiber is plated for reducing the mixing amount of the carbon fiber. In addition, Patent Literature 2 discloses that a dispersant is mixed with a carbon fiber resin composition for reducing the mixing amount of the carbon fiber.

CITATION LIST

Patent Literature

PTL 1: Japanese Patent Application Laid-Open No. H6-9819
PTL 2: Japanese Patent Application Laid-Open No. S59-106571.

SUMMARY OF INVENTION

Technical Problem

If a large amount of the carbon fiber is mixed, however, the flowability of the thermoplastic resin is deteriorated, and so the resultant mixture may have been difficult to flow into a narrow portion of a mold for a precision part such as a camera in some cases when conducting, for example, injection molding to cause molding failure, or product cost may have been increased in some cases by using the expensive carbon fiber in plenty.

In addition, when the surface of the carbon fiber is plated, good electromagnetic shielding characteristics can be actualized even when the addition amount of the carbon fiber is reduced. However, the adhesion between the carbon fiber and the plating is wrong in the first place, so that the strength of the resultant molded article, for example, the tensile modulus of elasticity may have been deteriorated in some cases. When the surface of the carbon fiber is plated in the first place, a large number of steps are necessary, so that the product cost may have been increased in some cases. Further, the electric resistance value increases by decrease in the addition amount itself of the carbon fiber, so that the antistatic property may have been deteriorated in some cases.

Solution to Problem

A resin composition according to the present invention is a resin composition including a resin, a carbon fiber and a conductive liquid, wherein the content of the resin is 47 to 94.9% by mass in the composition, the content of the carbon fiber is 5 to 50% by mass in the composition, and the content of the conductive liquid is 0.1 to 3% by mass in the composition, and wherein the concentration of an element contained in the conductive liquid as measured by SEM-EDS on the surface of the carbon fiber is 1.3 times or more as much as the concentration of the element contained in the resin.

In addition, a production process for a resin composition according to the present invention is a production process for a resin composition containing a resin, a carbon fiber and a conductive liquid, the process including the steps of treating the carbon fiber with the conductive liquid and mixing the carbon fiber treated with the conductive liquid with the resin.

Advantageous Effects of Invention

According to the present invention, high conductivity and electric field shielding property can be actualized without mixing a large amount of carbon fiber, so that the resultant resin composition has precise mold transferability even when injection molding is conducted with a mold for a precision part, and the resultant molded article can actualize high strength.

Further features of the present invention will become apparent from the following description of exemplary embodiments with reference to the attached drawings.

DESCRIPTION OF EMBODIMENTS

Preferred embodiments of the present invention will now be described in detail in accordance with the accompanying drawings.

The present invention to solve the above problems provides a resin composition which can actualize high conductivity, that is, high electric field shielding property without mixing a large amount of carbon fiber, and provides a production process for the resin composition.

The resin composition according to the present invention is a resin composition containing a resin, a carbon fiber and a conductive liquid, in which 47 to 94.9% by mass of the resin, 5 to 50% by mass of the carbon fiber and 0.1 to 3% by mass of the conductive liquid are contained in the composition. High conductivity can be thereby actualized even when the content of the carbon fiber is low. In addition, high electric field shielding property and antistatic property can be actualized.

The present invention will hereinafter be described.

Figure 1:
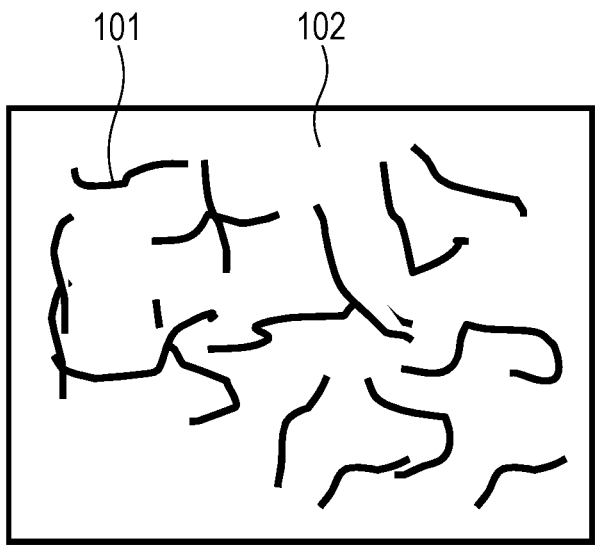
FIG. 1 schematically illustrates a mixed state of carbon fiber and a resin in the case of a small amount of the carbon fiber.
Figure 2:
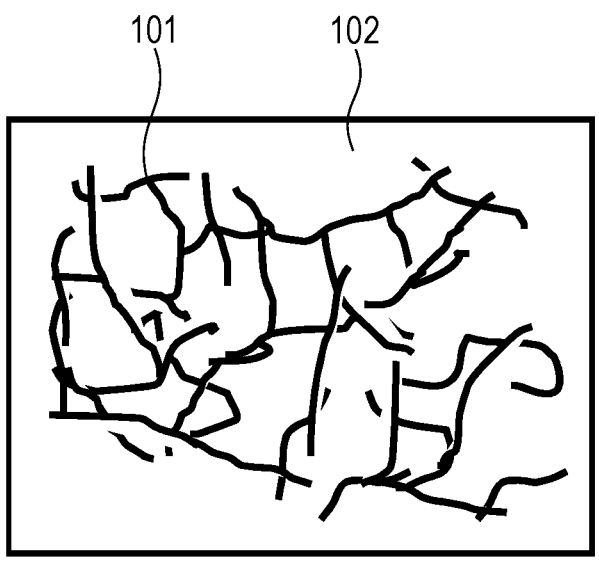
FIG. 2 schematically illustrates a mixed state of the carbon fiber and the resin in the case of a large amount of the carbon fiber.

FIG. 1 is a schematic view when a carbon fiber 101 is mixed with a resin. The conductivity of a resin 102 caused by the carbon fiber 101 is developed by mutual contact of the carbon fiber 101. Since the conductivity is not developed in the case where the carbon fiber 101 does not come into mutual contact, there is usually a need to mix a large amount of the carbon fiber 101 as illustrated in FIG. 2 for actualizing desired conductivity. The reason for this is that the resin 102 mixed with the carbon fiber 101 is an insulating material (about $10^{10}$ Ω·cm or more), and so the conductivity is not developed unless the carbon fiber 101 comes into mutual contact. In order to improve the contact chance, increasing the addition amount is generally employed as illustrated in FIG. 2.

The present inventor has paid attention to this mutual contact of the carbon fiber. It has been considered that the conductivity can be improved so long as the mutual contact of the carbon fiber can be increased even when the amount of the carbon fiber is not increased.

In order to increase the contact, there is a need to remove or eliminate the insulating material. However, it is also considered to make the resin which is an insulating material conductive with carbon black or the like. The strength of the carbon fiber is lowered in the first place when a large amount of the carbon black is mixed with the carbon fiber.

Thus, the present inventor has considered that if conductivity can be topically imparted to only a proximity portion (noncontact portion) of carbon fibers, the same effect as in the case of increasing the contact between the carbon fibers will be achieved.

A method of treating the surface of the carbon fiber with a conducting agent has been considered as a method for topically developing the conductivity. It is however difficult to cause a conductive particle to adhere to the surface of the carbon fiber. In addition, it is also difficult to treat carbon fibers (diameter: about 7 μm) with a conductive resin.

Thus, the present inventor has investigated a conducting agent to treat the surface of the carbon fiber. As a result, it has been found that the same effect as in the case of increasing the contact between the carbon fibers is achieved by conducting a treatment with a liquid conducting agent (conductive liquid).

Figure 3:
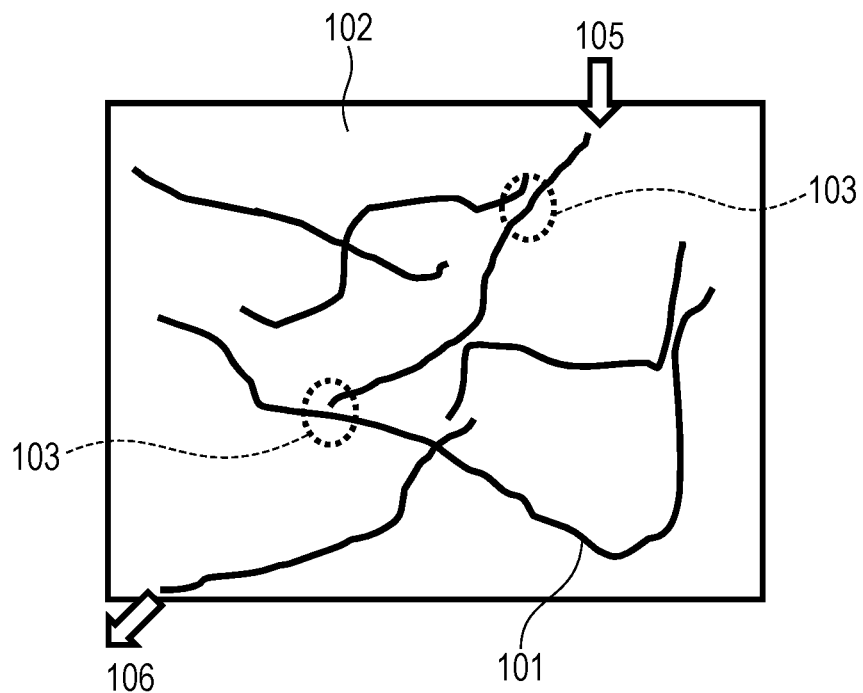
FIG. 3 schematically illustrates a conductive path between carbon fiber and a resin composition.
Figure 4:
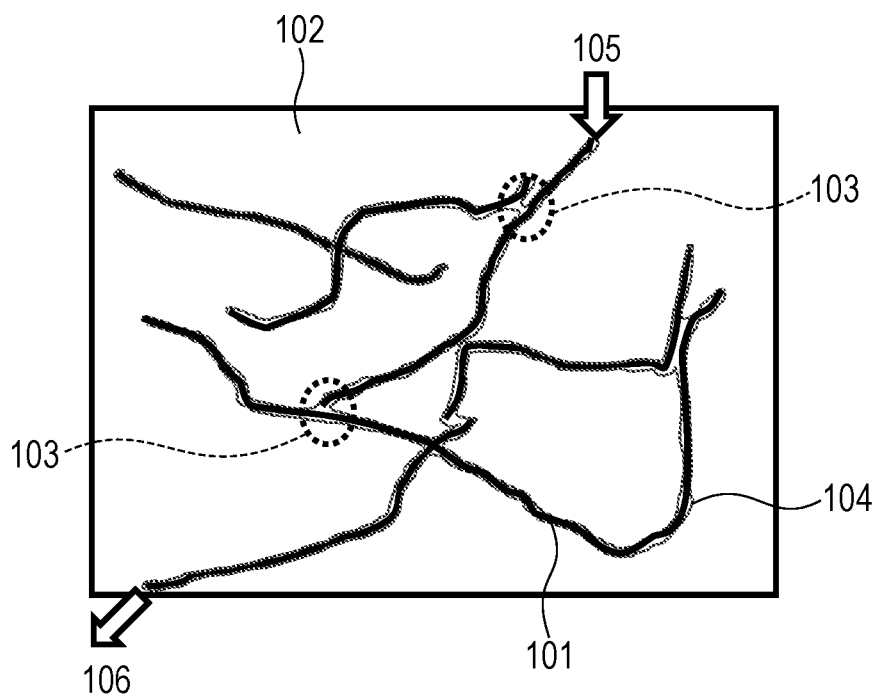
FIG. 4 schematically illustrates a conductive path among the carbon fiber, a liquid conducting agent and the resin composition.

In a portion 103 where the carbon fiber 101 mutually approaches, the carbon fiber 101 does not substantially come into mutual contact under the condition where the treatment with the liquid conducting agent is not conducted (FIG. 3), so that a current cannot reach a current outlet 106 because the resin 102 which is an insulator is present between the carbon fibers even when the current is going to flow to the direction of the arrow from a current inlet 105. As a result, a condition where the current does not flow is brought. However, when the surface of the carbon fiber 101 is treated with a liquid conducting agent 104, an insulating condition is not brought because the liquid conducting agent 104 is present at the portion 103 where the carbon fibers approach each other as illustrated in FIG. 4, so that the current can reach the current outlet 106 when the current is going to flow to the direction of the arrow from the current inlet 105. In addition, since the conductor is liquid, the liquid can freely move upon molding, so that the liquid can follow the carbon fiber even under the condition where the resin greatly flows like, for example, injection molding. Accordingly, the conducting agent is favorably liquid.

The liquid conducting agent is usefully an ionically conductive liquid having an ionic conduction mechanism because the ionic conduction mechanism can always actualize a certain conductivity without depending on a shape.

If the liquid conducting agent is a dispersion liquid in which conductive particles are dispersed, the particles are dissociated from each other by flowing of the resin. After all, the mechanism is the same conduction mechanism as that of the contact between the carbon fibers and is not favorable because the conductivity is varied.

In addition, if an ionically conductive resin or the like which is not liquid is mixed, the surface of the carbon fiber cannot be treated, and such a conductive resin does not have the followability with respect to the carbon fiber upon injection molding, so that the effect of the present invention is not developed.

A substance which is in the form of a liquid in at least a part of a temperature range from 0° C. to 40° C. may be favorably used as the conductive liquid used in the present invention.

The liquid according to the present invention is a liquid having a viscosity of 1,500 mm$^2$/s or less as measured on the basis of JIS Z 8803.

If the viscosity exceeds 1,500 mm$^2$/s, the flowability in the resin cannot be surely ensured, and the followability with respect to the carbon fiber is also lost, so that the effect of the present invention is not achieved.

The amount of the conductive liquid (C) used in the present invention is favorably 0.1 to 3% by mass.

If the amount of the conductive liquid (C) is less than 0.1% by mass, the conductive liquid (C) cannot be sufficiently present in the resin 102 which is an insulator, and so it is difficult to achieve the effect of the present invention.

In addition, if the amount of the conductive liquid (C) exceeds 3% by mass, the liquid may be deposited on the surface of the resultant product in some cases because of being liquid to cause mold staining or the like upon molding.

In addition, a more favorable range of the conductive liquid (C) is favorably from 0.3% by mass to 2% by mass. When the amount falls within this range, the effect of the present invention is achieved, and the risk of the mold staining or the like is more reduced.

The conductive liquid used in the present invention may be any liquid so long as it is a liquid in which no conductive particle is used. However, an ionically conductive liquid with good handlability or the like is favorable.

A mixture of a salt having ionic conductivity when ionically dissociated and a solvent which dissolves the salt, a substance which is ionically dissociated in at least a part of a temperature range from 0° C. to 40° C., that is, an ionic liquid, or the like is used as the ionically conductive liquid.

Examples of the salt having the ionic conductivity when ionically dissociated include tetraalkylammonium salts, ammonium salts, alkylsulfonic acid salts, alkylbenzenesulfonic acid salts, alkyl sulfates and lithium perchlorate. However, perfluoro compounds with high heat resistance of the salts thereof, such as sulfonic acid salts and amide-imide in particular, are favorable because they are mixed with the resin.

Examples of the sulfonic acid salts include potassium trifluoromethanesulfonate, potassium pentafluoroethanesulfonate, potassium heptafluoropropanesulfonate and potassium nanofluorobutanesulfonate.

Examples of the amide-imide include potassium bis(trifluoromethanesulfonyl)imide, potassium N,N-bis(nanofluorobutanesulfonyl)imide and potassium N,N-hexafluoropropane-1,3-disulfonylimide.

No particular limitation is imposed on the solvent which dissolves the salt. However, polyethylene glycol is favorable. Polyethylene glycol cannot retain its liquid state in at least a part of a temperature range from 0° C. to 40° C. as the molecular weight thereof increases, so that a proper molecular weight is selected according to an intended use. When the molecular weight is about 600, such polyethylene glycol is a liquid having a viscosity of 150 mm$^2$/s at 25° C., for example, so that the effect of the present invention can be achieved.

Examples of the ionic liquid include tri-n-butylmethylammonium bistrifluoromethanesulfoneimide, 1-ethyl-3-methylimidazolium trifluoromethanesulfonate, methyltri-n-octylammonium bis(trifluoromethane-sulfonyl)imide and 1-hexyl-3-methylimidazolium hexa-fluorophosphate, and any of them may be selected according to the service temperature of the resin used.

Figure 5:
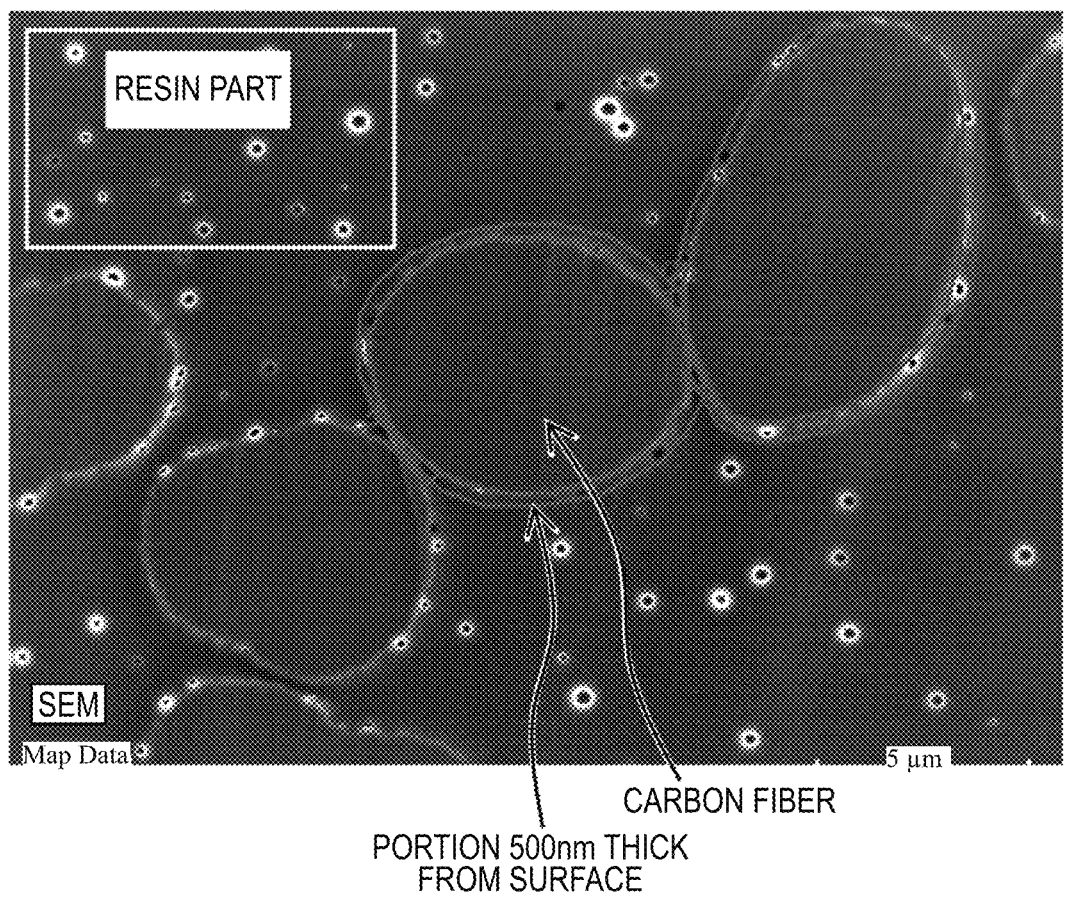
FIG. 5 illustrates a result of an SEM-EDS analysis of a sample in Example 1.

As a method for identifying whether these conductive liquids are present on the surface of the carbon fiber or not, there is, for example, a mapping method by SEM-EDS. According to this mapping method, the ratio of the conductive liquid which is present at each of a resin part and the surface of the carbon fiber can be identified. In the present invention, an analysis is conducted about a sample in which an atom which is present in the conductive liquid is different from an atom which is present in the resin to calculate the existence ratio. For example, a photograph illustrated in FIG. 5 is a result of the SEM-EDS analysis in Example 1. Since the resin is polycarbonate, S (sulfur) is not contained as an element in the resin, while S is contained in the conductive liquid, so that the concentrations can be compared between the resin part and the surface of the carbon fiber by conducting the atom mapping. In this case, the S concentration in a circumference 500 nm thick from the surface of the carbon fiber was compared with the concentration in the resin. Since the S concentration in the surface of the carbon fiber was 1.5 times as much as the concentration in the resin, so that it is judged that the conductive liquid is present at the surface of the carbon fiber. The concentration for the judgement is favorably 1.3 times or more though the effect of the present invention is developed so long as the concentration in the surface of the carbon fiber is higher than the concentration in the resin.

A thermoplastic resin is favorably used as the resin according to the present invention. No particular limitation is imposed on the thermoplastic resin used in the present invention. However, one or more resins selected from the group consisting of, for example, polycarbonate resins, styrene resins, acrylic resins, vinyl chloride resins, styrene-vinyl acetate copolymers, vinyl chloride-vinyl acetate copolymers, polyolefin resins such as polyethylene, polypropylene and polybutadiene, polyester resins such as polyethylene terephthalate (PET) and polybutylene terephthalate (PBT), polyvinylidene chloride, ionomer resins, polyurethane resins, silicone resins, fluorine-containing resins such as polyvinylidene fluoride (PVdF) resins and ethylene-tetrafluoroethylene (ETFE) copolymers, ethylene-ethyl acrylate copolymers, ethylene-vinyl alcohol copolymers, polyamide resins, polyimide resins, and modified polyphenylene oxide resins may be used. However, the thermoplastic resin is not limited to the above materials.

In addition, a thermoplastic resin elastomer may also be incorporated into the thermoplastic resin according to an intended use. No particular limitation is imposed on the thermoplastic resin elastomer. As examples thereof, however, there are mentioned polystyrene elastomers, polyolefin elastomers, polyester elastomers, polyurethane elastomers, polyamide elastomers and fluorine-containing polymer elastomers, though not limited thereto. In addition, when the conductivity is imparted with the thermoplastic resin elastomer, polyether ester amide and mixtures thereof, polyether ester, and the like are mentioned, though not limited thereto.

The carbon fiber used in the present invention is classified into PAN-based carbon fiber using polyacrylonitrile as a raw material and pitch-based carbon fiber using coal tar pitch or petroleum pitch as a raw material according to a difference in a starting material. Further, the pitch-based carbon fiber is classified into mesophase pitch-based carbon fiber and isotropic pitch-based carbon fiber according to the crystalline state of the pitch used in spinning, and any of them may be selected according to an intended use.

The amount of the carbon fiber (B) used in the present invention is favorably 5 to 50% by mass.

If the amount of the carbon fiber (B) is less than 5% by mass, the conductivity cannot be sufficiently developed because the addition amount of the carbon fiber is too small, and so it is difficult to achieve the effect of the present invention.

In addition, if the amount of the carbon fiber (B) exceeds 50% by mass, the flowability of the resin is insufficient because the addition amount of the carbon fiber is too large, and so the moldability of the resulting resin composition may be deteriorated in some cases.

In addition, a more favorable range of the carbon fiber (B) is favorably from 10% by mass to 30% by mass. When the amount falls within this range, the effect of the present invention is achieved, and the moldability is improved because the deterioration of the flowability is little.

The carbon fiber used in the present invention may be surface-treated with a sizing agent (binding agent) in advance before use. Examples of the binding agent include epoxy-, polyether- and urethane-based binding agents, and any of them may be selected according to an intended use.

The effect of the present invention can be achieved even when the treatment with the liquid conducting agent is conducted from on the binding agent. The molecular weight of the liquid conducting agent is very low so long as it lies in an ionic state, and so the liquid conducting agent can reach the surface of the carbon fiber passing through between the binding agents.

A dipping method, a spraying method or the like may be selected as a method for treating the carbon fiber with the liquid conducting agent (conductive liquid), though not limited thereto.

The dipping method is a method of molding a resin mixture while dipping the carbon fiber into a dipping tank just before the carbon fiber and the resin are molded together. According to this method, the treatment amount of the conductive liquid with which the surface of the carbon fiber is treated can be easily managed because the weight change of the dipping tank and the weight change of the carbon fiber can be simply measured.

Since a high pressure can be applied according to the spraying method, the conducive liquid is more easily impregnated into the surface of the carbon fiber. According to the spraying method, however, the whole of the liquid conducting agent ejected does not adhere to the surface of the carbon fiber, so that the accurate measurement of the amount of the liquid conducting agent which does not adhere is more difficult than the dipping method.

The resin composition according to the present invention can be produced by mixing the carbon fiber treated with the liquid conducting agent (conductive liquid) with the resin. Examples of a process for producing such a resin composition include a process of performing kneading and forming by means of any of various extruders of a twin screw extrusion method, a single screw extrusion method, a wire coating method and the like, a process of using any of various mixers such as a kneader and a Banbury mixer, a process of performing kneading and forming by means of any of various roll mills such as a two-roll mill and a three-roll mill, an LFT-D process and a pultrusion process, though not limited thereto.

In order to be applicable to injection molding, the carbon fiber resin composition is desirably formed into pellets, so that a linearly formed article is formed by the twin screw extrusion method or the wire coating method, and the linearly formed article is then cut into pellets by a strand cutter or the like.

Various additives may be added to the resin composition according to the present invention in addition to the carbon fiber and the liquid conducting agent. Examples of the various additives include various additives used in a resin, such as a filler, a dispersant, an antioxidant, a weathering agent and a decomposition inhibitor.

No particular limitation is imposed on the filler to be added. However, examples of an inorganic filler include mica, glass fiber, glass beads, cryolite, zinc oxide, titanium oxide, calcium carbonate, clays, talc, silica, wollastonite, zeolite, diatomaceous earth, silica sand, pumice powder, slate powder, alumina, alumina white, aluminum sulfate, barium sulfate, lithopone, calcium sulfate and molybdenum disulfide, though not limited thereto.

In addition, one or more fillers are suitably selected as an organic filler among tetrafluoroethylene resin particles, trifluorochloro-ethylene resin particles, tetrafluoroethylene-hexafluoropropylene resin particles, vinyl fluoride resin particles, vinylidene fluoride resin particles, difluorodichloroethylene resin particles and copolymers thereof, carbon fluoride, silicone resin particles, silicone compound rubber powers such as silicone rubber particles, ebonite powder, ceramics, wood powder, coconut shell powder, cork powder, cellulose powder, and wood pulp, though not always limited thereto.

The resin composition according to the present invention not only has high electric field shielding property, but is low in electric resistance value and excellent in antistatic performance, so that it can be suitably used in an exterior member for an optical instrument. As examples of the optical instrument, there are mentioned telescopes, binoculars, microscopes, cameras and endoscopes.

EXAMPLES

The present invention will hereinafter be described in more detail by Examples and Comparative Examples. However, the present invention is not limited to these Examples at all.

In Examples and Comparative Examples, the following items were measured and evaluated.

Electric Resistance Value:

As a measuring apparatus, Loresta GP MCP-T610 model (manufactured by Mitsubishi Chemical Analytic Co., Ltd., conforming to JIS K 7194) and a series four-point probe (ASP) are used as a resistance meter and an electrode, respectively. The measurement is conducted at arbitrary five points under the conditions where a voltage of 10 V is applied, and then the average value thereof is taken as a measurement data. In addition, the measurement is conducted under an environment of 25° C.±3° C. and a relative humidity of 55±5%.

A sample is prepared in the following manner. First, an injection molding machine SE180D (manufactured by Sumitomo Heavy Industries, Ltd.) and a plasticizing device C360 are used to conduct injection molding. The molding temperature varies according to a resin used. However, about 310° C. is favorable in the case of, for example, a polycarbonate resin. The form of a sample for electric resistance measurement and electric field shield measurement is set to the form of a flat plate of 150 mm×150 mm×2 mm. The electric resistance value was evaluated according to the following criterion under which the antistatic characteristics can be sufficiently exhibited.

OK: 9.50E−2 Ω·cm or less

NG: exceeding 9.50E−2 Ω·cm.

Electric Field Shield:

The measurement of the electric field shield is conducted according to the KEC (General Incorporated Association, Kansai Electronic Industry Development Center, KEC) method by using the same sample as the sample used in the measurement and evaluation of the electric resistance value. In addition, the measurement is conducted under the environment of 25° C.±3° C. and a relative humidity of 55±5%. The electric field shield was evaluated according to the following criterion:

OK: 45 dB or more (300 MHz)

NG: Less than 45 dB (300 MHz).

Figure 7:
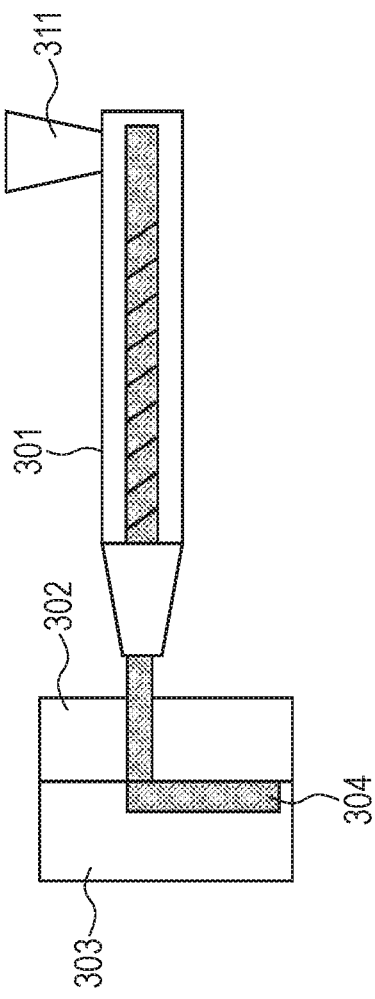
FIG. 7 schematically illustrates an injection molding apparatus, molds and a molded article.

Young's Modulus:

After a resin mixture is dried at a drying temperature suitable for a resin used in a hopper 311 of an injection molding apparatus 301 illustrated in FIG. 7, the preset temperature is set to a temperature suitable for the resin, and injection molding is then conducted by means of a dumbbell-shaped No. 1 mold (thickness: 2 mm), thereby preparing a dumbbell-shaped sample. This sample was subjected to measurement at a tensile rate of 10 mm/min by means of 5581 (product name) manufactured by Instron Co. The Young's modulus was evaluated according to the following criterion:

OK: 2,500 MPa or more

NG: Less than 2,500 MPa.

Evaluation of Mold Transferability:

The sample used in the measurement and evaluation of the electric resistance value and electric field shield was evaluated and ranked as "OK" where the sample was able to be molded into a predetermined shape by an injection molding machine or as "NG" where the sample was unable to be molded.

Comprehensive Evaluation:

A sample where all the above respective items were ranked as "OK" was regarded as "OK" in the comprehensive evaluation, while a sample where even one item thereof was ranked as "NG" was regarded as "NG" in the comprehensive evaluation.

Example 1

Preparation of Liquid Conducting Agent:

| | |
|---|---|
| Polyethylene glycol | 70% by mass |
| Potassium bis(trifluoromethanesulfonyl)imide (product of Mitsubishi Materials Corporation, EF-N112) | 30% by mass. |

The above materials were uniformly mixed while stirring to prepare a conductive liquid. The conductivity of this liquid was determined by a digital multimeter FLUKE 87 V (manufactured by Fluke Corporation) and was found to be $4.8 \times 10^6 \Omega$ at 25° C. This liquid was regarded as Liquid Conducting Agent 1. The viscosity of this liquid was 160 mm$^2$/s at 25° C.

Resin for Molding:

A polycarbonate resin (product of Idemitsu Kosan Co., Ltd., A1700) was used as a resin, and this resin is taken as Polycarbonate Resin 1.

Carbon Fiber:

PYROFIL TRH50.60M RJ (2,500 m/roll, filament diameter 6 μm, and number of filaments 60,000; product of Mitsubishi Rayon Co., Ltd.) is taken as Carbon Fiber 1.

Figure 6:
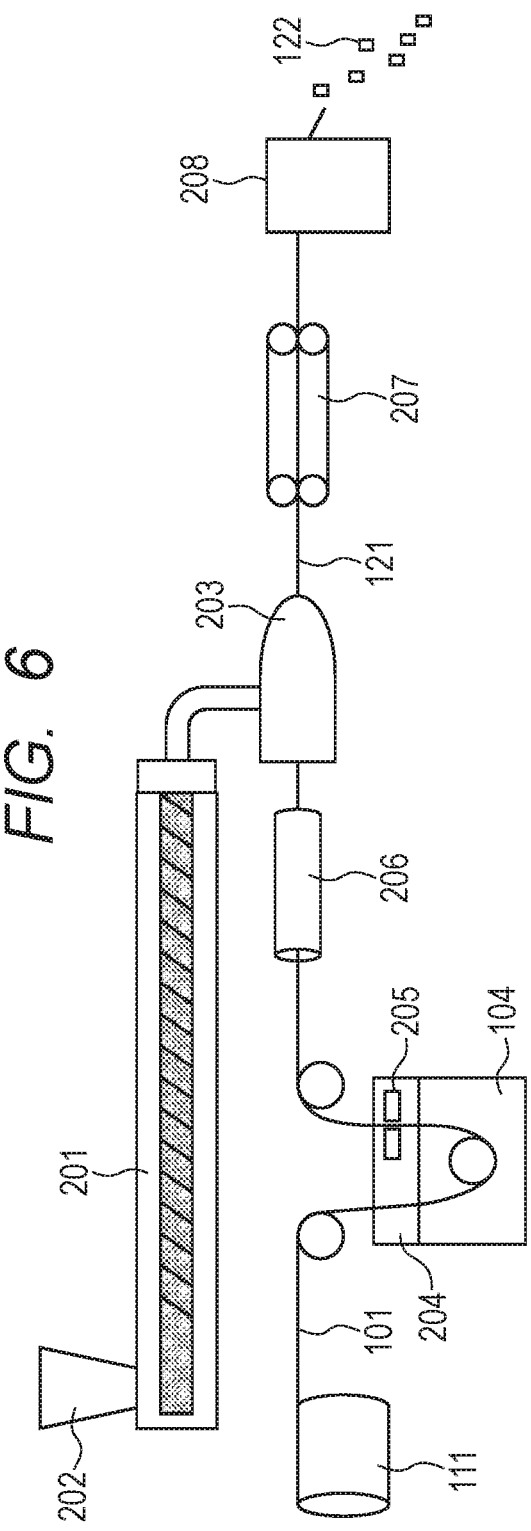
FIG. 6 schematically illustrates a production apparatus for producing a carbon fiber master batch.

Preparation of Carbon Fiber Master Batch:

A crosshead die 203 for wire coating was installed in a single screw extruder 201 illustrated in FIG. 6, carbon fiber 111 wound in the form of a bobbin was dipped into a dipping tank 204, an excess liquid conducting agent was removed by a removal pad 205 after the dipping, and the temperature of the carbon fiber was then raised to 300° C. in a carbon fiber preheating vessel 206. Thereafter, the carbon fiber was carried to the crosshead die 203 and coated with the polycarbonate which was fed into a hopper 202 and melted by the single screw extruder 201. A strand 121 which is a carbon fiber resin composition coated with the polycarbonate was conveyed at a constant speed by a belt conveyance device 207 and then cut in lengths of 3 mm by a strand cutter 208 to obtain a master batch 122. The mass loss of the liquid conducting agent (1), the mass loss of the carbon fiber bobbin and the mass loss of the polycarbonate at this time were measured. As a result, the mixing ratio among them was as follows:

| | |
|---|---|
| Polycarbonate 1 | 54.1% by mass |
| Carbon Fiber 1 | 45.0% by mass |
| Liquid Conducting Agent 1 | 0.9% by mass. |

This master batch is taken as Master Batch (A).

Master Batch (A) and Polycarbonate 1 were then mixed at the following mixing ratio:

| | |
|---|---|
| Master Batch (A) | 44.44% by mass |
| Polycarbonate 1 | 55.56% by mass. |

This mixture is taken as Resin Mixture (A). The mixing ratio of this Resin Mixture (A) was as follows:

| | |
|---|---|
| Polycarbonate 1 | 79.6% by mass |
| Carbon Fiber 1 | 20.0% by mass |
| Liquid Conducting Agent 1 | 0.4% by mass. |

This Resin Mixture (A) was dried for 6 hours at 120° C. and then fed into a hopper 311 of an injection molding apparatus 301 illustrated in FIG. 7, and the preset temperature was adjusted to 310° C. to conduct injection molding, thereby preparing a flat plate 304 of 150 mm×150 mm×2 mm. The temperatures of molds 302 and 303 for the injection molding at this time were set to 80° C. The injection molding pressure at this time was 40 MPa, and the flowability of the resin mixture was high, thereby exhibiting good mold transferability.

Measurement Results of Sample:

The results are shown in Table 1. Excellent results were obtained both for conductivity and electric field shielding property compared with a sample of Comparative Example 1 (described later) in which the carbon fiber was mixed in the same amount. With respect to the conductivity, the electric resistance value of the resin mixture is greatly lower than that of Comparative Example 1 in which the treatment with the liquid conducting agent is not conducted though the electric resistance value of the liquid conducting agent was higher than that of the carbon fiber. It is thus considered that the resistance lowering is not owing to resistance decrease caused by adding the liquid conducting agent itself but owing to the reduced contact resistance between the carbon fibers. With respect to the electric field shielding property, it was found that the electric field shield is 8.2 dB higher at 300 MHz than that of Comparative Example 1, and so the thickness of the flat plate can be reduced by 65% when the electric field shielding characteristics are set to the same level as in Comparative Example 1. In addition, the Young's modulus was also as considerably high as 2,720 MPa.

Distribution Result of Liquid Conducting Agent by SEM-EDS:

The ratio of the concentration of sulfur (S) in the surface of the carbon fiber to the concentration of sulfur (S) in the resin is shown in Table 1.

The resin composition which was obtained according to the present invention was able to lower the electric resistance value thereof without mixing a large amount of the carbon fiber to improve the electric field shielding property.

Example 2

Liquid Conducting Agent:

Tri-n-butylmethylammonium bistrifluoromethanesulfoneimide (produce of 3M Co., FC-4400) was used. This substance is a salt having properties of liquid at 25° C., and is what is called an ionic liquid. The conductivity of this liquid was determined at 25° C. by FLUKE 87 V and was found to be $3.0 \times 10^4 \Omega$. This liquid was regarded as Liquid Conducting Agent 2. The viscosity of this liquid was 531 mm$^2$/s at 25° C.

Resin for Molding:

A polycarbonate resin (product of Idemitsu Kosan Co., Ltd., A1700) was used as a resin, and this resin is taken as Polycarbonate Resin 1.

Carbon Fiber:

PYROFIL TRH50.60M RJ (2,500 m/roll, filament diameter 6 μm, and number of filaments 60,000; product of Mitsubishi Rayon Co., Ltd.) is taken as Carbon Fiber 1.

Preparation of Carbon Fiber Master Batch:

Master Batch (B) was obtained by means of the same production apparatus as in Example 1. The mass loss of the liquid conducting agent (2), the mass loss of the carbon fiber bobbin and the mass loss of the polycarbonate at this time were measured. As a result, the mixing ratio among them was as follows:

| | |
|---|---|
| Polycarbonate 1 | 54.1% by mass |
| Carbon Fiber 1 | 45.0% by mass |
| Liquid Conducting Agent 2 | 0.9% by mass. |

Master Batch (B) and Polycarbonate 1 were then mixed at the following mixing ratio:

| | |
|---|---|
| Master Batch (B) | 44.44% by mass |
| Polycarbonate 1 | 55.56% by mass. |

This mixture is taken as Resin Mixture (B). The mixing ratio of this Resin Mixture (B) was as follows:

| | |
|---|---|
| Polycarbonate 1 | 79.6% by mass |
| Carbon Fiber 1 | 20.0% by mass |
| Liquid Conducting Agent 2 | 0.4% by mass. |

This Resin Mixture (B) was dried for 6 hours at 120° C. and then fed into the hopper 311 of the injection molding apparatus 301 illustrated in FIG. 7, and the preset temperature was adjusted to 310° C. to conduct injection molding, thereby preparing a flat plate 304 of 150 mm×150 mm×2 mm. The temperatures of molds 302 and 303 for the injection molding at this time were set to 80° C. The injection molding pressure at this time was 39 MPa, and the flowability of the resin mixture was high, thereby exhibiting good mold transferability.

Measurement Results of Sample:

The results are shown in Table 1. Excellent results were obtained both for conductivity and electric field shielding property compared with a sample of Comparative Example 1 in which the carbon fiber was mixed in the same amount. This is considered to be owing to the reduced contact resistance between the carbon fibers like Example 1. With respect to the electric field shielding property, it was found that the electric field shield is 8.2 dB higher at 300 MHz than that of Comparative Example 1, and so the thickness of the flat plate can be reduced by 65% when the electric field shielding characteristics are set to the same level as in Comparative Example 1.

In addition, the reason why the conductivity was slightly lower than the conductivity of Example 1 though the electric resistance value of the liquid conducting agent of Example 1 was lower is considered to be attributable to slightly lowered followability with respect to the carbon fiber since the viscosity of the liquid was higher than that of Example 1. In addition, the Young's modulus was as considerably high as 2,825 MPa.

Distribution Result of Liquid Conducting Agent by SEM-EDS:

The ratio of the concentration of sulfur (S) in the surface of the carbon fiber to the concentration of sulfur (S) in the resin is shown in Table 1.

The resin composition which was obtained according to the present invention was able to lower the electric resistance value thereof without mixing a large amount of the carbon fiber improve the electric field shielding property.

Example 3

Liquid Conducting Agent:
Liquid Conducting Agent 1 was used as in Example 1.
Resin for Molding:
Polycarbonate 1 was used as in Example 1.
Carbon Fiber:
Carbon Fiber 1 was used as in Example 1.
Preparation of Carbon Fiber Master Batch:

A crosshead die 203 for wire coating was installed in a single screw extruder 201 illustrated in FIG. 6, carbon fiber 111 wound in the form of a bobbin was dipped into a dipping tank 204, an excess liquid conducting agent was removed by a removal pad 205 after the dipping, the carbon fiber 111 was again dipped into the dipping tank 204 followed by removing an excess liquid conducting agent by the removal pad 205, and the temperature of the carbon fiber was then raised to 300° C. in a carbon fiber preheating vessel 206. Thereafter, the carbon fiber was carried to the crosshead die 203 and coated with the polycarbonate which was fed into a hopper 202 and melted by the single screw extruder 201. A strand 121 which is a carbon fiber resin composition coated with the polycarbonate was conveyed at a constant speed by a belt conveyance device 207 and then cut in lengths of 3 mm by a strand cutter 208 to obtain a master batch 122. The mass loss of the liquid conducting agent (1), the mass loss of the carbon fiber bobbin and the mass loss of the polycarbonate at this time were measured. As a result, the mixing ratio among them was as follows:

| | |
|---|---|
| Polycarbonate 1 | 53.3% by mass |
| Carbon Fiber 1 | 45.0% by mass |
| Liquid Conducting Agent 1 | 1.7% by mass. |

This master batch is taken as Master Batch (C).

Master Batch (C) and Polycarbonate 1 were then mixed at the following mixing ratio:

| | |
|---|---|
| Master Batch (C) | 12.00% by mass |
| Polycarbonate 1 | 88.00% by mass. |

This mixture is taken as Resin Mixture (C). The mixing ratio of this Resin Mixture (C) was as follows:

| | |
|---|---|
| Polycarbonate 1 | 94.508% by mass |
| Carbon Fiber 1 | 5.400% by mass |
| Liquid Conducting Agent 1 | 0.092% by mass. |

This Resin Mixture (C) was dried for 6 hours at 120° C. and then fed into a hopper 311 of an injection molding apparatus 301 illustrated in FIG. 7, and the preset temperature was adjusted to 310° C. to conduct injection molding, thereby preparing a flat plate 304 of 150 mm×150 mm×2 mm. The temperatures of molds 302 and 303 for the injection molding at this time were set to 80° C. The injection molding pressure at this time was 32 MPa, and the flowability of the resin mixture was high, thereby exhibiting good mold transferability.

Measurement Results of Sample:

The results are shown in Table 1. Excellent results were obtained both for conductivity and electric field shielding property compared with Comparative Example 1. This is considered to be owing to the reduced contact resistance between the carbon fibers as in Example 1. With respect to the electric field shielding property, it was found that the electric field shield is 1.3 dB higher at 300 MHz than that of Comparative Example 1, although the amount of the carbon fiber was 5.400% by mass. In addition, the Young's modulus was 2,035 MPa because of the reduced amount of the carbon fiber.

Distribution Result of Liquid Conducting Agent by SEM-EDS:

The ratio of the concentration of sulfur (S) in the surface of the carbon fiber to the concentration of sulfur (S) in the resin is shown in Table 1.

The resin composition which was obtained according to the present invention was able to lower the electric resistance value thereof without mixing a large amount of the carbon fiber to improve the electric field shielding property.

Example 4

Liquid Conducting Agent:
Liquid Conducting Agent 1 was used as in Example 1.
Resin for Molding:
Polycarbonate 1 was used as in Example 1.
Carbon Fiber:
Carbon Fiber 1 was used as in Example 1.
Preparation of Carbon Fiber Master Batch:

A crosshead die 203 for wire coating was installed in a single screw extruder 201 illustrated in FIG. 6, carbon fiber 111 wound in the form of a bobbin was dipped into a dipping tank 204, an excess liquid conducting agent was removed by a removal pad 205 after the dipping, and the temperature of the carbon fiber was then raised to 300° C. in a carbon fiber preheating vessel 206. Thereafter, the carbon fiber was carried to the crosshead die 203 and coated with the polycarbonate which was fed into a hopper 202 and melted by the single screw extruder 201. At this time, the feeding amount of the polycarbonate was reduced to the half of the feeding amount of the polycarbonate in Example 1. A strand 121 which is a carbon fiber resin composition coated with the polycarbonate was conveyed at a constant speed by a belt conveyance device 207 and then cut in lengths of 3 mm by a strand cutter 208 to obtain a master batch 122. The mass loss of the liquid conducting agent (1), the mass loss of the carbon fiber bobbin and the mass loss of the polycarbonate at this time were measured. As a result, the mixing ratio among them was as follows:

| | |
|---|---|
| Polycarbonate 1 | 27.0% by mass |
| Carbon Fiber 1 | 72.1% by mass |
| Liquid Conducting Agent 1 | 0.9% by mass. |

This master batch is taken as Master Batch (D).

Master Batch (D) and Polycarbonate 1 were then mixed at the following mixing ratio:

| | |
|---|---|
| Master Batch (D) | 65.00% by mass |
| Polycarbonate 1 | 35.00% by mass. |

This mixture is taken as Resin Mixture (D). The mixing ratio of this Resin Mixture (D) was as follows:

| | |
|---|---|
| Polycarbonate 1 | 52.615% by mass |
| Carbon Fiber 1 | 46.800% by mass |
| Liquid Conducting Agent 1 | 0.585% by mass. |

This Resin Mixture (D) was dried for 6 hours at 120° C. and then fed into a hopper 311 of an injection molding apparatus 301 illustrated in FIG. 7, and the preset temperature was adjusted to 310° C. to conduct injection molding, thereby preparing a flat plate 304 of 150 mm×150 mm×2 mm. The temperatures of molds 302 and 303 for the injection molding at this time were set to 80° C. The injection molding pressure at this time was 60 MPa. The mold transferability was good. The injection molding could be performed, although the amount of the carbon fiber was larger than that in Comparative Example 3. This is probably because the polyethylene glycol used in the liquid conducting agent served as a plasticizer.

Measurement Results of Sample:

The results are shown in Table 1. Excellent results were obtained both for conductivity and electric field shielding property compared with Comparative Example 1. This is considered to be owing to the reduced contact resistance between the carbon fibers as in Example 1. With respect to the electric field shielding property, it was found that the electric field shield was as considerably high as 65.24 dB at 300 MHz, since the amount of the carbon fiber was 46.8% by mass. In addition, the Young's modulus was 4,580 MPa because of the increased amount of the carbon fiber.

Distribution Result of Liquid Conducting Agent by SEM-EDS:

The ratio of the concentration of sulfur (S) in the surface of the carbon fiber to the concentration of sulfur (S) in the resin is shown in Table 1.

The resin composition which was obtained according to the present invention was able to be molded even in the case of a large amount of the carbon fiber, able to considerably lower the electric resistance value thereof, and able to realize the remarkably high electric field shielding property.

Comparative Example 1

Resin for Molding:
A polycarbonate resin (product of Idemitsu Kosan Co., Ltd., A1700) was used as a resin, and this resin is taken as Polycarbonate Resin 1.
Carbon Fiber:
PYROFIL TRH50.60M RJ (2,500 m/roll, filament diameter 6 μm, and number of filaments 60,000; product of Mitsubishi Rayon Co., Ltd.) is taken as Carbon Fiber 1.
Preparation of Carbon Fiber Master Batch:

Master Batch (E) was obtained without conducting the treatment with the liquid conducting agent by means of the same production apparatus as in Example 1. The mass loss of the carbon fiber bobbin and the mass loss of the polycarbonate at this time were measured. As a result, the mixing ratio of them was as follows:

| | |
|---|---|
| Polycarbonate | 55.0% by mass |
| Carbon Fiber | 45.0% by mass. |

Master Batch (E) and the polycarbonate were then mixed at the following mixing ratio:

| | |
|---|---|
| Master Batch (E) | 44.44% by mass |
| Polycarbonate 1 | 55.56% by mass. |

This mixture is taken as Resin Mixture (E). The mixing ratio of this Resin Mixture (E) was as follows:

| | |
|---|---|
| Polycarbonate 1 | 80.0% by mass |
| Carbon Fiber 1 | 20.0% by mass. |

This Resin Mixture (E) was dried for 6 hours at 120° C. and then fed into the hopper 311 of the injection molding apparatus 301 illustrated in FIG. 7, and the preset temperature was adjusted to 310° C. to conduct injection molding, thereby preparing a flat plate 304 of 150 mm×150 mm×2 mm. The temperatures of molds 302 and 303 for the injection molding at this time were set to 80° C. The injection molding pressure at this time was 42 MPa, and the flowability of the resin mixture was high, thereby exhibiting good mold transferability. In addition, the Young's modulus was as considerably high as 2,850 MPa.

Measurement Results of Sample:

The results are shown in Table 1. Poor results were obtained both for conductivity and electric field shielding property compared with the samples of Examples 1 and 2 in which the carbon fiber was mixed in the same amount. This is considered to be due to the higher contact resistance between the carbon fibers even when the addition amount of the carbon fiber was the same. With respect to the electric field shielding property, the electric field shield was 8.2 dB lower at 300 MHz than that of Example 1.

Distribution Result of Liquid Conducting Agent by SEM-EDS:

Since the liquid conducting agent was not used, no analytical result was obtained.

Comparative Example 2

Resin for Molding:

A polycarbonate resin (product of Idemitsu Kosan Co., Ltd., A1700) was used as a resin, and this resin is taken as Polycarbonate Resin 1.

Carbon Fiber:

Carbon fiber which is obtained by conducting a nickel plating treatment on the surface of Carbon Fiber 1 is taken as Carbon Fiber 2.

Preparation of Carbon Fiber Master Batch:

Master Batch (F) was obtained without conducting the treatment with the liquid conducting agent by means of the same production apparatus as in Example 1. The mass loss of the carbon fiber bobbin and the mass loss of the polycarbonate at this time were measured. As a result, the mixing ratio of them was as follows:

| Polycarbonate | 80.0% by mass |
|---|---|
| Carbon Fiber | 20.0% by mass. |

Master Batch (F) and the polycarbonate were then mixed at the following mixing ratio:

| Master Batch (F) | 50.0% by mass |
|---|---|
| Polycarbonate 1 | 50.0% by mass. |

This mixture is taken as Resin Mixture (F). The mixing ratio of this Resin Mixture (F) was as follows:

| Polycarbonate 1 | 90.0% by mass |
|---|---|
| Carbon Fiber 2 | 10.0% by mass. |

This Resin Mixture (F) was dried for 6 hours at 120° C. and then fed into the hopper 311 of the injection molding apparatus 301 illustrated in FIG. 7, and the preset temperature was adjusted to 310° C. to conduct injection molding, thereby preparing a flat plate 304 of 150 mm×150 mm×2 mm. The temperatures of molds 302 and 303 for the injection molding at this time were set to 80° C. The injection molding pressure at this time was 36 MPa, and the flowability of the resin mixture was high, thereby exhibiting good mold transferability. In addition, the Young's modulus was as low as 1,932 MPa, and this is considered to be attributable to bonding failure to the resin due to the plating treatment.

Measurement Results of Sample:

The results are shown in Table 1. The conductivity was very poor because the addition amount of the carbon fiber was small. The electric field shielding property was good by virtue of the effect of the metal plating.

Distribution Result of Liquid Conducting agent by SEM-EDS:

Since the liquid conducting agent was not used, no analytical result was obtained.

Comparative Example 3

Resin for Molding:

A polycarbonate resin (product of Idemitsu Kosan Co., Ltd., A1700) was used as a resin, and this resin is taken as Polycarbonate Resin 1.

Carbon Fiber:

PYROFIL TRH50.60M RJ (2,500 m/roll, filament diameter 6 μm, and number of filaments 60,000; product of Mitsubishi Rayon Co., Ltd.) is taken as Carbon Fiber 1.

Preparation of Carbon Fiber Master Batch:

Master Batch (G) was obtained without conducting the treatment with the liquid conducting agent by means of the same production apparatus as in Example 1. The mass loss of the carbon fiber bobbin and the mass loss of the polycarbonate at this time were measured. As a result, the mixing ratio of them was as follows:

| Polycarbonate | 55.0% by mass |
|---|---|
| Carbon Fiber | 45.0% by mass. |

Master Batch (G) and the polycarbonate were then mixed at the following mixing ratio:

| Master Batch (G) | 66.66% by mass |
|---|---|
| Polycarbonate 1 | 33.34% by mass. |

This mixture is taken as Resin Mixture (G). The mixing ratio of this Resin Mixture (G) was as follows:

| Polycarbonate 1 | 70.0% by mass |
|---|---|
| Carbon Fiber 1 | 30.0% by mass. |

This Resin Mixture (G) was dried for 6 hours at 120° C. and then fed into the hopper 311 of the injection molding apparatus 301 illustrated in FIG. 7, and the preset temperature was adjusted to 310° C. to conduct injection molding, thereby preparing a flat plate 304 of 150 mm×150 mm×2 mm. The temperatures of molds 302 and 303 for the injection molding at this time were set to 80° C.

The injection molding pressure at this time was 85 MPa because the content of the carbon fiber was very high, and so the flowability of the resin was greatly deteriorated. As a result, the resin was unable to be sufficiently transferred to the molds, and what is called short shot occurred. Since the short shot occurred, a sample capable of being used for the measurement was not obtained, and so the Young's modulus was unable to be measured.

Measurement Results of Sample:

The results are shown in Table 1. Since the short shot occurred, a sample capable of being used for the measurement was not obtained, and so no measurement result was obtained.

Distribution Result of Liquid Conducting Agent by SEM-EDS:

Since the liquid conducting agent was not used, no analytical result was obtained.

Comparative Example 4

Liquid Conducting Agent:
Liquid Conducting Agent 1 was used as in Example 1.
Resin for Molding:
Polycarbonate 1 was used as in Example 1.
Carbon Fiber:
Carbon Fiber 1 was used as in Example 1.
Preparation of Carbon Fiber Master Batch:

A crosshead die 203 for wire coating was installed in a single screw extruder 201 illustrated in FIG. 6, carbon fiber 111 wound in the form of a bobbin was not dipped into Liquid Conducting Agent 1, and the temperature of the carbon fiber was then raised to 300° C. in a carbon fiber preheating vessel 206. Thereafter, the carbon fiber was carried to the crosshead die 203 and coated with the polycarbonate which was fed into a hopper 202 and melted by the single screw extruder 201. A strand 121 which is a carbon fiber resin composition coated with the polycarbonate was conveyed at a constant speed by a belt conveyance device 207 and then cut in lengths of 3 mm by a strand cutter 208 to obtain a master batch 122. The mixing ratio of the master batch 122 was as follows:

| Polycarbonate 1 | 55.0% by mass |
| Carbon Fiber 1 | 45.0% by mass |

This master batch is taken as Master Batch (H).

Polycarbonate 1 and Liquid Conducting Agent 1 were subjected to kneading in the following mixing ratio using a twin-screw kneader (TEX30α manufactured by JAPAN STEEL WORKS LTD., L/D=45) under conditions 310° C., 300 rpm and discharge rate 20 kg/h, thereby being pelletized.

| Polycarbonate 1 | 99.5% by mass |
| Liquid Conducting Agent 1 | 0.5% by mass |

This kneaded product is taken as Resin Kneaded Product (I).

Resin Kneaded Product (I) and Master Batch (H) were then mixed at the following mixing ratio:

| Master Batch (H) | 44.44% by mass |
| Resin Kneaded Product (I) | 55.56% by mass. |

This mixture is taken as Resin Mixture (H). The mixing ratio of this Resin Mixture (H) was as follows:

| Polycarbonate 1 | 79.6% by mass |
| Carbon Fiber 1 | 20.0% by mass |
| Liquid Conducting Agent 1 | 0.4% by mass. |

This Resin Mixture (H) was dried for 6 hours at 120° C. and then fed into a hopper 311 of an injection molding apparatus 301 illustrated in FIG. 7, and the preset temperature was adjusted to 310° C. to conduct injection molding, thereby preparing a flat plate 304 of 150 mm×150 mm×2 mm. The temperatures of molds 302 and 303 for the injection molding at this time were set to 80° C. The injection molding pressure at this time was 40 MPa, and the flowability of the resin mixture was high, thereby exhibiting good mold transferability.

Measurement Results of Sample:

The results are shown in Table 1. Although the material mixing ratio was the same as that in Example 1, the conductivity and the electric field shielding property were deteriorated. This is probably because of the following reasons. Since the surface of the carbon fiber is not directly treated with Liquid Conducting Agent 1 in advance, no action to reduce the contact resistance of the carbon fiber is generated. Additionally, Liquid Conducting Agent 1 is dispersed into the resin part to function as a plasticizer for the resin; consequently, each one of the carbon fibers is separated by the resin with high electric resistance to make it more difficult to cause contact of the carbon fiber. The reason for the deterioration of the electric field shielding property is considered to be the same reason. In addition, the Young's modulus was as considerably high as 3,250 MPa because of the good dispersibility of the carbon fiber.

Distribution Result of Liquid Conducting Agent by SEM-EDS:

The ratio of the concentration of sulfur (S) in the surface of the carbon fiber to the concentration of sulfur (S) in the resin is shown in Table 1.

TABLE 1

| | | Electric resistance value Ω · cm | | Electric field shield (300 MHz) dB | | Ratio of liquid conducting agent | Young's modulus (MPa) | | Evaluation of mold transferability | Comprehensive evaluation |
|---|---|---|---|---|---|---|---|---|---|---|
| | Material | Value | Evaluation | Value | Evaluation | | Value | Evaluation | | |
| Ex. 1 | Resin Mixture (A) | 3.92E−02 | OK | 48.61 | OK | 1.5 times | 2720 | OK | OK | OK |
| Ex. 2 | Resin Mixture (B) | 5.25E−02 | OK | 48.25 | OK | 1.3 times | 2825 | OK | OK | OK |
| Ex. 3 | Resin Mixture (C) | 9.30E−02 | OK | 41.52 | OK | 2.9 times | 2035 | OK | OK | OK |
| Ex. 4 | Resin Mixture (D) | 8.50E−03 | OK | 65.24 | OK | 1.6 times | 4580 | OK | OK | OK |
| Comp. Ex. 1 | Resin Mixture (E) | 1.21E−01 | NG | 40.22 | NG | — | 2850 | OK | OK | NG |

TABLE 1-continued

| | Material | Electric resistance value Ω·cm | | Electric field shield (300 MHz) dB | | Ratio of liquid conducting agent | Young's modulus (MPa) | | Evaluation of mold transferability | Comprehensive evaluation |
|---|---|---|---|---|---|---|---|---|---|---|
| | | Value | Evaluation | Value | Evaluation | | Value | Evaluation | | |
| Comp. Ex. 2 | Resin Mixture (F) | 2.33E+06 | NG | 59.88 | OK | — | 1932 | NG | OK | NG |
| Comp. Ex. 3 | Resin Mixture (G) | — | — | — | — | — | — | — | NG | NG |
| Comp. Ex. 4 | Resin Mixture (H) | 2.05E+07 | NG | 32.50 | NG | 1.0 times | 3250 | OK | OK | NG |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-241361, filed Dec. 10, 2015, which is hereby incorporated by reference herein in its entirety.

REFERENCE SIGNS LIST 101 carbon fiber
102 resin
103 portion where the carbon fibers approach each other
104 liquid conducting agent
105 current inlet
106 current outlet
111 carbon fiber
121 strand
122 master batch
201 single screw extruder
202 hopper
203 crosshead die
204 dipping tank
205 removal pad
206 carbon fiber preheating vessel
207 belt conveyance device
208 strand cutter
301 injection molding apparatus
302 mold
303 mold
304 flat plate
311 hopper

The invention claimed is:

1. A resin composition comprising:
a resin;
a carbon fiber; and
an ionically conductive liquid,
wherein the ionically conductive liquid coats a surface of the carbon fiber, and
wherein the ionically conductive liquid is a mixture of a salt having ionic conductivity when ionically dissociated and a solvent, which dissolves the salt,
wherein the ionically conductive liquid contains a sulfur element (S), and
wherein a concentration of the sulfur (S) element contained in the ionically conductive liquid as measured by SEM-EDS on the surface of the carbon fiber is 1.3 times or more as much as a concentration of the sulfur (S) element contained in the resin.

2. The resin composition according to claim 1, wherein a viscosity of the ionically conductive liquid is 1,500 mm$^2$/s or less as measured based on JIS Z 8803.

3. The resin composition according to claim 1, wherein the resin is a thermoplastic resin.

4. A production process for a resin composition comprising:
a resin;
a carbon fiber; and
an ionically conductive liquid,
the process comprising:
coating the carbon fiber with the ionically conductive liquid; and
mixing the carbon fiber coated with the ionically conductive liquid with the resin,
wherein the ionically conductive liquid is a mixture of a salt having ionic conductivity when ionically dissociated and a solvent, which dissolves the salt,
wherein the ionically conductive liquid contains a sulfur (S) element, and
wherein a concentration of the sulfur (S) element contained in the ionically conductive liquid as measured by SEM-EDS on a surface of the carbon fiber is 1.3 times or more as much as a concentration of the sulfur (S) element contained in the resin.

5. An optical instrument comprising an external part composed of a resin composition,
wherein the resin composition comprises:
a resin;
a carbon fiber; and
an ionically conductive liquid,
wherein the ionically conductive liquid coats a surface of the carbon fiber,
wherein the ionically conductive liquid is a mixture of a salt having ionic conductivity when ionically dissociated and a solvent, which dissolves the salt,
wherein the ionically conductive liquid contains a sulfur (S) element, and
wherein a concentration of the sulfur (S) element contained in the ionically conductive liquid as measured by SEM-EDS on the surface of the carbon fiber is 1.3 times or more as much as a concentration of the sulfur (S) element contained in the resin.

6. The resin composition according to claim 1, wherein a content of the resin in the composition is 47 to 94.9% by mass, a content of the carbon fiber in the composition is 5 to 50% by mass, and a content of the ionically conductive liquid in the composition is 0.1 to 3% by mass.

7. The production process according to claim 4, wherein the carbon fiber is surface-treated with a sizing agent.

8. The production process according to claim 4, wherein the coating of the carbon fiber with the conductive liquid is by a dipping method.

9. A resin composition produced by the production process according to claim 4.

\* \* \* \* \*